United States Patent
Finn et al.

(10) Patent No.: US 9,749,259 B2
(45) Date of Patent: *Aug. 29, 2017

(54) FLEXIBLE DETERMINISTIC BINARY SCHEDULER

(71) Applicant: Cisco Technology, Inc., San Jose, CA (US)

(72) Inventors: Norman William Finn, Livermore, CA (US); Rong Pan, Saratoga, CA (US); Hiroshi Suzuki, Palo Alto, CA (US); Linda Tin-Wen Cheng, San Jose, CA (US); Peter Geoffrey Jones, Campbell, CA (US); Hariprasada Rao Ginjpalli, Cupertino, CA (US); Rudolph Benedict Klecka, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,737

(22) Filed: Aug. 26, 2016

(65) Prior Publication Data

US 2017/0054655 A1    Feb. 23, 2017

Related U.S. Application Data

(63) Continuation of application No. 14/164,167, filed on Jan. 25, 2014, now Pat. No. 9,455,933.

(51) Int. Cl.
*H04L 12/911* (2013.01)
*H04L 12/863* (2013.01)
(Continued)

(52) U.S. Cl.
CPC ........ *H04L 47/826* (2013.01); *H04L 47/6255* (2013.01); *H04L 49/25* (2013.01); *H04L 49/00* (2013.01)

(58) Field of Classification Search
None
See application file for complete search history.

(56) References Cited

U.S. PATENT DOCUMENTS 6,034,960 A    3/2000 Beshai et al.
6,215,795 B1   4/2001 Chauhan
(Continued)

OTHER PUBLICATIONS

Cisco, Cisco Nexus 5000 Series Architecture: The building blocks of the Unified Fabric, Jun. 2009.*

(Continued)

*Primary Examiner* — Tejis Daya
(74) *Attorney, Agent, or Firm* — Meunier Carlin & Curfman LLC (57) ABSTRACT

A method for allocating port assignments for transmitting a reserved network stream across a network node comprises determining a cycle time associated with a network node. The method also comprises establishing, for at least one port of the network node, a plurality of virtual layers associated with the cycle time, wherein each of the plurality of virtual layers is divided into 2n equally-spaced slots per cycle (where n>0). The method further comprises receiving a reserved stream request associated with transmission of a reserved stream across the node, and determining a number of slots required to transmit the reserved stream. The method also comprises assigning one or more slots associated with a port of the network node to the transmission of packets associated with the reserved stream based on the determined number of slots. The method further comprises transmitting the stream according to the slot assignment associated with the port of the network node.

22 Claims, 5 Drawing Sheets

(51) Int. Cl.
*H04L 12/947* (2013.01)
*H04L 12/931* (2013.01)

(56) References Cited

U.S. PATENT DOCUMENTS

| | | |
|---|---|---|
| 7,020,161 B1 | 3/2006 | Eberle et al. |
| 7,155,716 B2 | 12/2006 | Hooman et al. |
| 2003/0007484 A1 | 1/2003 | Beshai |
| 2004/0076161 A1 | 4/2004 | Lavian et al. |
| 2004/0120322 A1* | 6/2004 | Wu ................... H04L 12/5602 370/395.4 |
| 2005/0238058 A1 | 10/2005 | Peirce et al. |
| 2006/0215583 A1 | 9/2006 | Castagnoli |
| 2008/0123682 A1 | 5/2008 | Yackoski et al. |
| 2008/0138067 A1* | 6/2008 | Beshai ................. H04L 49/357 398/45 |
| 2008/0259950 A1 | 10/2008 | Visa et al. |
| 2011/0131385 A1 | 6/2011 | Henriksson et al. |
| 2011/0317584 A1 | 12/2011 | Wu |
| 2012/0002675 A1 | 1/2012 | Kauschke et al. |

OTHER PUBLICATIONS

Peristaltic Shaper V0.0—An example of how MJT's Peristaltic Shaper might appear if incorporated into Clause 8, Mar. 14, 2013.

\* cited by examiner

16-SLOT BINARY SCHEDULE

FLEXIBLE DETERMINISTIC BINARY SCHEDULER

CROSS REFERENCE TO RELATED APPLICATION

This application is a continuation of U.S. patent application Ser. No. 14/164,167, filed on Jan. 25, 2014, now U.S. Pat. No. 9,455,933, which is incorporated by reference herein in its entirety.

TECHNICAL FIELD

The present disclosure relates generally to reserving network node resources for transmitting priority streams of data and, more particularly, to systems and methods for flexibly reserving cycle-slots in ports of network nodes based on a binary schedule scheme.

BACKGROUND

Large numbers of deterministic networks are in existence today. They are generally based either upon proprietary digital standards, upon enhancements to IEEE 802.3 Ethernet that are unlikely to become common, or upon overprovisioning of standard Ethernet bridged LANs. They are typically small and, if based on Ethernet, generally bridged rather than routed. They are characterized by the applications they enable—true real-time applications, that demand ultra-high packet delivery probability and reliable maximum latency guarantees. Most automobiles, planes, or trains built, today, incorporate one or more of these networks, as does many complex automated machinery on a production floor.

Classical packet network redundancy (e.g., bridging or routing protocols) are generally insufficient for achieving the low loss ratio required for these types of applications, as fault detection and recovery times are can be too slow by orders of magnitude. While overprovisioning, weighted queuing, and traffic shaping are useful for some genuine real-time applications, those techniques are not in themselves sufficient for at least two reasons. First, many critical applications require more bandwidth than these techniques can support (e.g., multiple uncompressed HD television streams). Second, weighting and shaping, at even the lower stream bandwidths, typically provide guarantees no better than $10^{-4}$ for congestion loss, and provide no absolute latency guarantee at all. Furthermore, these techniques are infamous both for requiring expert knowledge to match the controllable parameters to the application's needs, and for their inflexibility in the face of changing requirements.

Both operator-configured and application-requested path redundancy are generally needed for high reliability applications to overcome losses caused by equipment failure and by chance events such as cosmic rays. Redundancy alone is not sufficient, however, because congestion losses on the different paths are both non-negligible, and may be correlated. By eliminating the dominant cause of packet loss, congestion, the requirements of these applications can be met. Moreover, for time synchronization to the 1 μs level, some kind of hardware assist is likely required; software is generally too far from the physical media to support such accuracy.

As the size of the network grows, both geographically and logically, the requirements for latency and delivery probability relax. However, the requirements remain much higher than current networking techniques can support.

The presently disclosed systems and methods for flexibly reserving cycle-slots in ports of network nodes based on a binary schedule scheme are directed to overcoming one or more of the problems set forth above and/or other problems in the art.

DETAILED DESCRIPTION

In accordance with one aspect, the present disclosure is directed to a method for allocating port assignments for transmitting a reserved network stream across a network node. The method may comprise determining a cycle time associated with a network node, and establishing, for at least one port of the network node, a plurality of virtual layers associated with the cycle time, wherein each of the plurality of virtual layers is divided into $2^n$ equally-spaced slots per cycle, where n>0. The method further comprises receiving a reserved stream request associated with transmission of a reserved stream across the node, and determining a number of slots required to transmit the reserved stream. The method may also comprise assigning one or more slots associated with a port of the network node to the transmission of packets associated with the reserved stream based on the determined number of slots. The stream may be transmitted according to the slot assignment associated with the port of the network node.

According to another aspect, the present disclosure is directed to a network switch device, comprising a memory having associated therewith at least one reserve queue, at least one port coupled to the memory, and a processor communicatively coupled to the memory and the at least one port. The processor is configured to determine a cycle time associated with the network switch device. The process may also be configured to establish, for at least one port of the network switch device, a plurality of virtual layers associated with the cycle time, wherein each of the plurality of virtual layers is divided into $2^n$ equally-spaced slots per cycle, where n>0. The processor may be further configured to receive a reserved stream request associated with transmission of a reserved stream across the network switch device. The processor may also be configured to determine a number of slots required to transmit the reserved stream, and assign one or more slots associated with a port of the network switch device to transmit packets associated with the reserved stream based on the determined number of slots. The processor may be further configured to transmit the stream according to the slot assignment associated with the at least one port of the network switch device.

In accordance with yet another aspect, the present disclosure is directed to a computer-readable medium for use on a computer system, the computer-readable medium including computer-executable instructions for causing the computer system to perform a method for allocating port assignments for transmitting a reserved network stream across a network node. The method may comprise determining a cycle time associated with a network node, and establishing, for at least one port of the network node, a plurality of virtual layers associated with the cycle time, wherein each of the plurality of virtual layers is divided into $2^n$ equally-spaced slots per cycle, where n>0. The method may also comprise receiving a reserved stream request associated with transmission of a reserved stream across the node, and determining a number of slots required to transmit the reserved stream. One or more slots associated with a port of the network node may be assigned to transmit packets associated with the reserved stream based on the determined number of slots. The method may further comprise transmitting the stream according to the slot assignment associated with the port of the network node.

Figure 1:
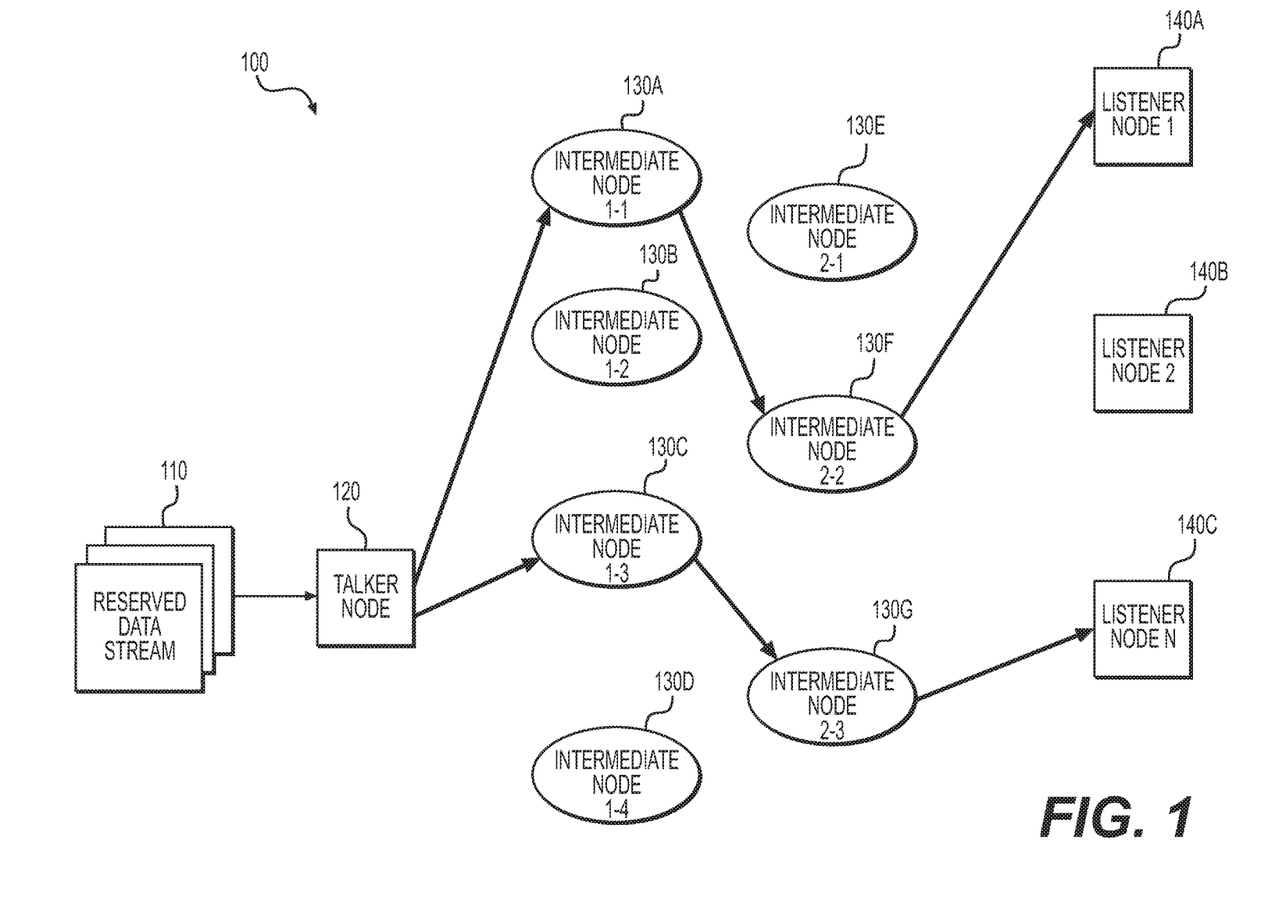
FIG. 1 provides a diagram of an exemplary network environment in which systems and methods associated with certain disclosed embodiments may be implemented.

FIG. 1 illustrates an exemplary network environment 100 in which systems and methods associated with certain disclosed embodiments may be implemented. As illustrated in FIG. 1, network environment 100 may be any network that allows one or more talker nodes 120 to transfer data streams, such as reserved data stream 110, to one or more listener nodes 140a-140c via a network path through one or more intermediate node(s) 130a-130g. It is contemplated that network environment 100 may include additional and/or different numbers and types of nodes than those shown in FIG. 1 and explained in the exemplary embodiments described herein. Indeed, those skilled in the art will recognize that, for different enterprise networks, there may be any number of different configurations of network equipment that may allow for data streams to be transmitted from an origin to a destination. The exemplary disclosed embodiments are directed to certain aspects/features for flexibly scheduling network bandwidth to dedicate a portion of the communication capability of most any Ethernet-based network to the transmission of certain priority or "reserved" data streams, based on a deterministic binary scheduling scheme. In this scheme, which will be illustrated and explained in greater detail hereafter allows each node to establish its own port scheduling scheme for transmitting the packets in the reserved stream, while sharing the schedule across the other nodes in the path to guarantee delivery, limit latency, and increase reliability.

Talker node 120, intermediate nodes 130a-130g, and listener nodes 140a-140c, may each embody a piece of network routing equipment, such as a network router or switch, configured to receive packetized data, queue the data for transmission through the node at an available time, determine the next node in the network to which to send the packetized data, and transmit the data to the next node. Many conventional network switches transmit the data based on a first-in, first-out (FIFO) scheme. In some cases, data packets may be placed in different queues based on priority, where recently received higher-priority data is able to be transmitted before older, lower priority data. Importantly, however, these types of prioritization scheme may still be inadequate for certain systems that rely on precision timing and strict packet transmission guarantees. As such, each of the presently disclosed talker node 120, intermediate nodes 130a-130g, and listener nodes 140a-140c may be configured to schedule specific slots where certain types of high-priority or "reserve" data are granted pre-scheduled, guaranteed slots for transmitting data through the network node.

Although the presently disclosed embodiments can be employed in most any network switch or routing device with sufficient programming, according to one embodiment, talker node, intermediate nodes 130a-130g, and listener nodes 140a-140c may each be a Cisco network switch device, such as a Cisco Catalyst 2000, 3000, or 4000-series switch or any other switch that utilizes Cisco's DopplerD or DopplerG family of ASIC products. Importantly, however, the techniques and features described herein should be adaptable to be employed in most any processor-based network switch device from any manufacturer.

As illustrated in the network environment 100 of FIG. 1, a talker node 120 may receive a reserved data stream request. A "reserved" data stream request refers to any request for allocated bandwidth that invokes the presently disclosed procedure for dedicated slot allocations within the deterministic binary schedule for one or more ports of talker node 120, one or more intermediate nodes 130a-130g, and one or more of listener nodes 140a-140c. Talker node 120 is configured to receive a "reserved" data stream request and determine the number and size of slots per transmission cycle that must be dedicated by each node along the transmission path to the data stream destination (i.e., one or more of listener nodes 140a-140c) in order to guarantee the desired transmission parameters (e.g., maximum jitter, minimum or maximum latency, resilience to network failures, and includes the requirement that the maximum loss rate due to congestion is 0, maximum bits/second, maximum packet size, transmission frequency, maximum burst size, observation interval, etc.) requested in the reserved data stream.

Talker node 120 may be configured to identify one or more intermediate nodes 130a-130g that provide an adequate communication path between talker node 120 and one or more requested listener nodes 140a-140c. Talker node 120 may be configured to determine the appropriate path based on a number of criteria, such as, for example, the available per-cycle capacity of each of the candidate nodes, the latency between candidate nodes, and other network performance and/or capacity metrics.

According to one example, talker node 120 may receive a request for a reserved data stream 110 and determine, based on information contained in the request, that the reserved data stream is to be delivered to listener nodes 140a, 140c. Talker node 120 may identify a path between talker node 120 and listener node 140a that travels through intermediate node 1-1 (130a) and intermediate node 2-2 (130l). As explained above, although there may be a number of other network paths between talker node 120 and listener node 140a, talker node 120 may determine the most suitable path based on a number of network performance criteria, such as availability of slot allocation spaces sufficient to satisfy the requirements of the requested reserved data stream. In similar fashion, talker node 120 may identify a path between talker node 120 and listener node 140c that travels through intermediate node 1-3 (130c) and intermediate node 2-3 (130g).

Figure 2:
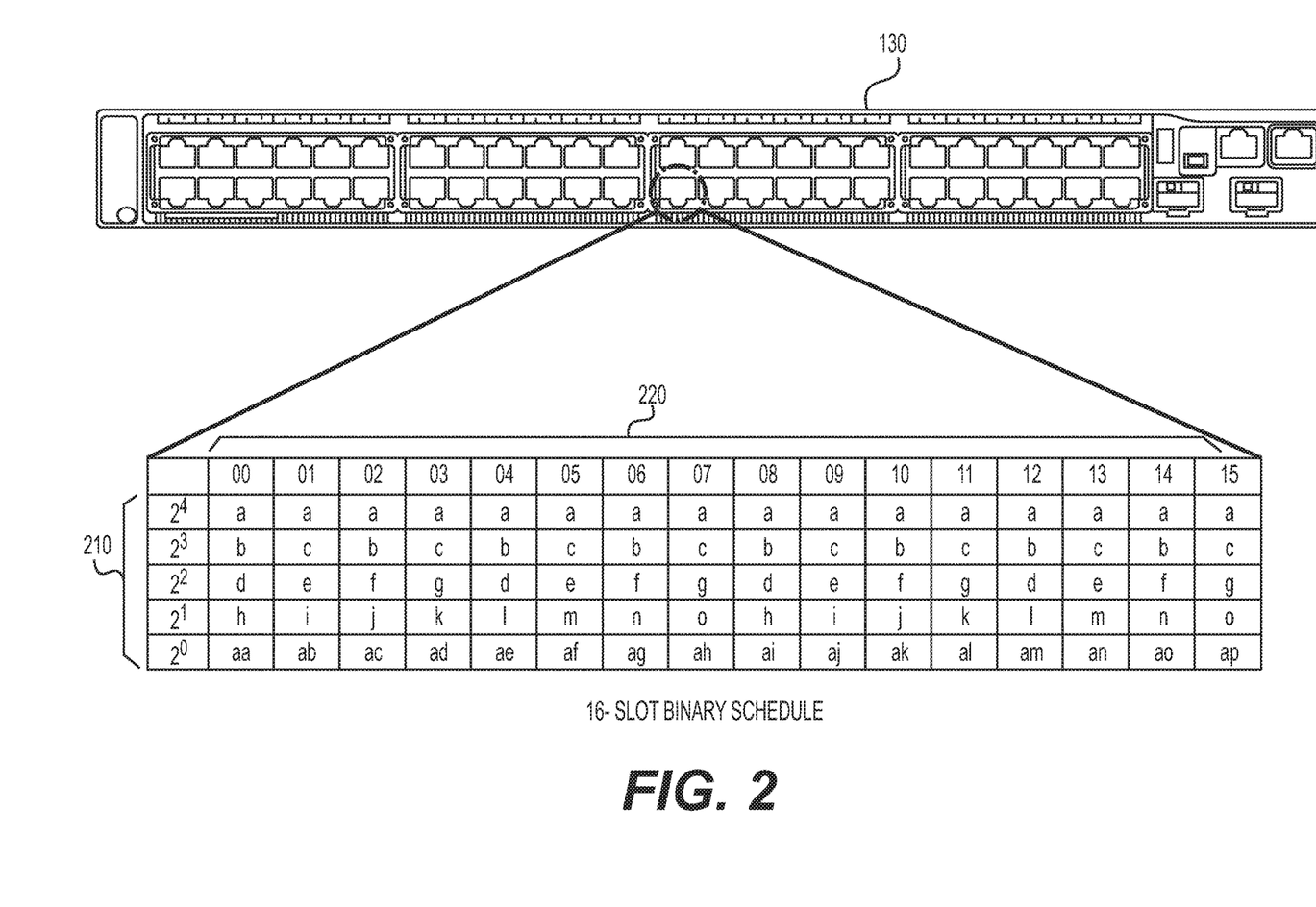
FIG. 2 provides a logical diagram of an exemplary port schedule scheme for a 16-slot multi-layer binary schedule, consistent with certain disclosed embodiments.

Once the path for the reserved data stream has been identified, each of the nodes along the path may dedicate the number of slots per cycle to sufficiently satisfy the network performance requirements contained in the request for the reserved data stream 110. FIG. 2 illustrates a scheduling scheme for an exemplary port on a network node 130 that will handle transmission of the reserved data stream 110.

According to one embodiment, each network node, and optionally, end stations as well, may synchronize their clocks to within 1 μs or better, although tighter tolerance for high-speed links may be imposed. Each port in each network node that carries reserved streams outputs frames according to a schedule. Each port can have a different schedule. The schedule selects packets for transmission from queues that are dedicated to reserved streams. At certain times, called "slots," the port is reserved for transmission from specific queues. At other times, queues holding packets other than those in reserved streams can contend for selection to be output. The scheduled can be thought of (though not necessarily implemented as) a time-ordered list of slots and the queue from which each slot is to draw its packet. If no packet is in the queue selected by a given time slot, then a packet not belonging to a reserved stream can be transmitted, but not one from a reserved queue. The slots are evenly spaced in time, and the pattern of queue selection repeats over and over. The period of repetition is called a "cycle."

According to one embodiment, every slot on every port on every network node is the same size (in bytes) as every other slot, and large enough to transmit the longest packet permitted for any reserved stream (a network-wide configuration parameter). For example, there may be $2^M$ slots in a cycle. Talker node 120 may guarantee, for a given reserved stream, to transmit ≤N packets/cycle. When a reservation is granted for a stream to pass through a port, the stream is allocated $2^n$ slots, where $2^n \geq N$. in the schedule. The slots assigned to one stream are evenly spaced every $2^{M-n}$ slots.

Whenever a reservation is made, the slots may have to be reallocated. Reallocation is done per stream, in order of decreasing "levels", where a level is an allocation size of $2^x$ slots from x=M to x=0. At each level, if there is more than one request for $2^n$ slots for n=x, at most one can be accepted, and the others must be denied. If there is exactly one request for n=x, it can be granted and allocated. If there is no request for n=x, then lower values of x are tested. $2^q$ streams, each requiring $2^{x-q}$ slots, can share the $2^x$ slots at level x. When multiple allocations are made to one level, each allocation is assigned every $2^q$ slots, so is evenly spread over the cycle.

An example of this allocation plan is shown in the table of FIG. 2. Each letter represents an "allocation" that can be assigned to a stream. If any slot of an allocation (denoted by a particular letter(s)) is assigned to a stream, all of the slots of that allocation are assigned to that stream. Each allocation may be spread uniformly over the schedule, and if the schedule does not change, uniformly throughout time. The "h" allocation, for example, is evenly space every 8 slots (of layer $2^1$, whereas the "c" allocation is spaced every other slot (of layer $2^3$). If this table were represented as a bit vector, allocation for a plurality of streams would proceed by first initializing the table of S slots 220 (S is a power of 2) for a port to reflect that all slots are unassigned. When assigning multiple streams, network node 130 may sort the streams by descending number of slots w required (w is a power of 2). The total number of slots required is less than or equal to S. The network node 130 may select the first (largest) unallocated stream, and assign the stream the slot corresponding to the first unallocated slot in the table, and each S/w slots after that one. The slot assignment process may be repeated by selecting the next largest unassigned stream, and assigning the slot corresponding to the first available unallocated slot in the table, and each S/w slots after that one. This process may be separately executed for assigning slots to streams for each port in the network node.

In order to avoid the penalty of wasting $2^n$–N slots when a stream does not require a number of packets per cycle that is not a power of two, a stream can be assigned slots from multiple layers (element 210 of FIG. 2). For example, a stream requiring 21 slots per cycle could be assigned slots from the $2^4$, $2^2$, and $2^0$ layers. Layering streams, however, changes the slot assignment algorithm, because the slots are no longer added in $2^x$ slots with x monotonically decreasing. The algorithm can be changed to sort the requests by decreasing order of importance. An example of such an order, from most to least significance, may be a "rank" of importance (e.g., a 911 call goes ahead of all other traffic) and a time-of-day that the request was made, with the oldest requests being more important.

The scheduling algorithm may be configured to select streams, in sorted order, adding up the slots used by each one, and discarding all flows after one is found that would make the total greater than the number of slots per cycle. The various stream's layers may be assigned to slots in the cycle in order of decreasing $2^x$. According to one embodiment, and in general, the streams should not be packed so as to use up all of the slots (commonly referred to as the "knapsack problem") and it is NP-complete.

For example, for flows A-D, of 10 (8+2), 4, 1, and 1 slots, respectively, the 16-slot schedule shown in the table of FIG. 2, could be represented as:

TABLE 1

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| $2^4$ | | | | | | | | | | | | | | | | |
| $2^3$ | A | | A | | A | | A | | A | | A | | A | | A | |
| $2^2$ | | B | | | | B | | | | B | | | | B | | |
| $2^1$ | | | A | | | | | | | | | A | | | | |
| $2^0$ | | | | | | | | C | | | | | | | | D |

Example allocation A = 10, B = 4, C = D = 1

Another example might be for streams J-M of 5, 5, 5, and 1 slots, respectively:

TABLE 2

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| $2^4$ | | | | | | | | | | | | | | | | |
| $2^3$ | | | | | | | | | | | | | | | | |
| $2^2$ | J | K | L | | J | K | L | | J | K | L | | J | K | L | |

Example allocation J = K = L = 5, M = 1

TABLE 2-continued

Example allocation J = K = L = 5, M = 1

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| $2^1$ | | | | | | | | | | | | | | | | |
| $2^0$ | | | | J | | | | K | | | | L | | | | M |

From these sample allocations, it is clear that the relationships between the layers of a single stream can be very ragged; only stream K of the J-M group has an even distribution.

Because every stream has a baseline schedule layer allocated to it that is regular throughout a cycle, any network node can substitute a revised schedule for the existing one at a cycle boundary. Because, however, the cycles in every bridge are synchronized, and because the number of slots assigned to any given stream per cycle is a constant throughout the network, every node can alter its schedule from cycle to cycle without violating the latency guarantees.

Figure 3:
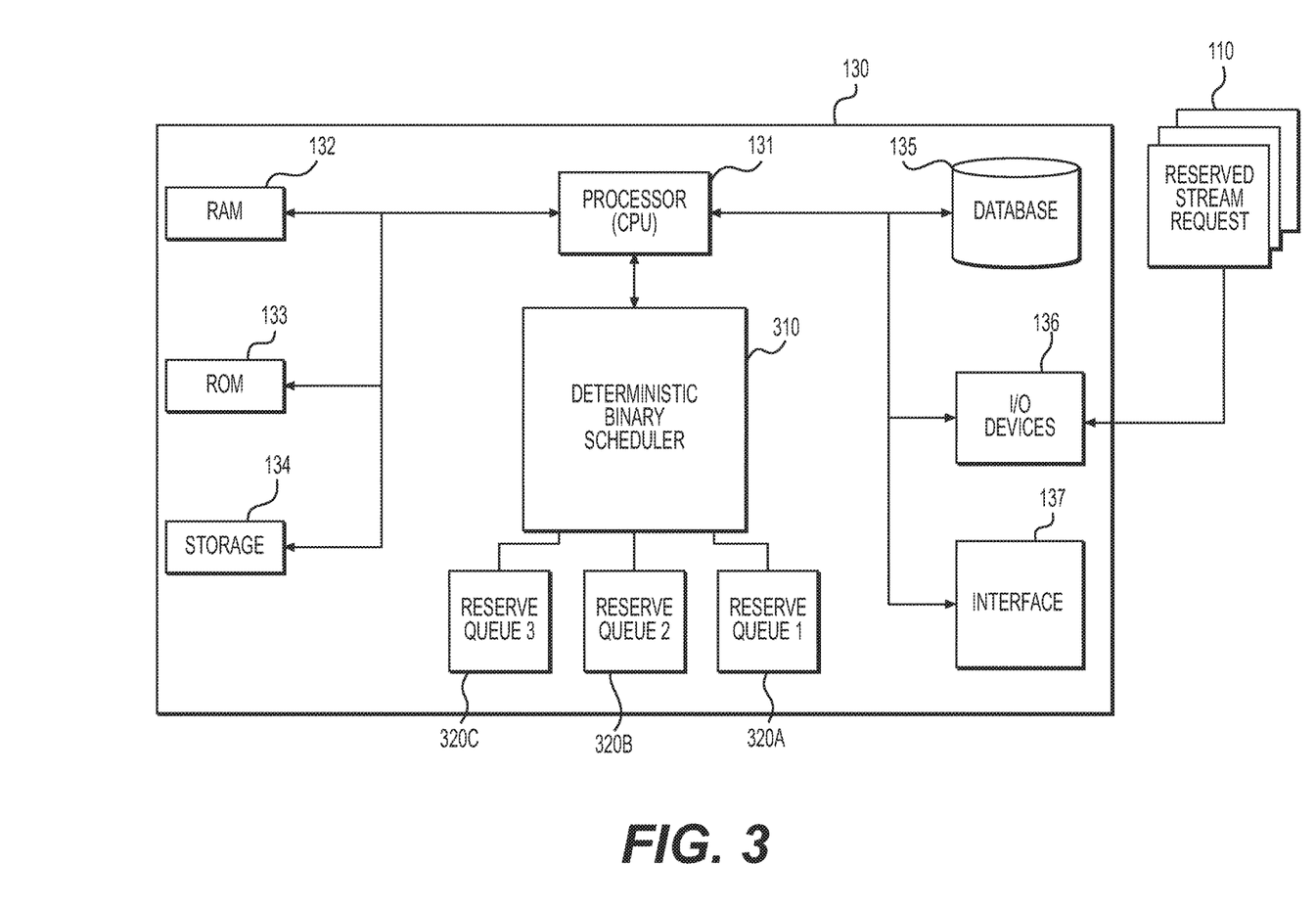
FIG. 3 provides a schematic illustration of certain exemplary components associated with one or more network nodes that may be employed within the network environment, in accordance with certain disclosed embodiments.

FIG. 3 illustrates an exemplary schematic diagram associated with the one or more nodes 130 used in network environment 100. As explained, each of nodes 130 may include processor-based network switch or routing device that includes its own microcontroller, volatile and non-volatile memory, one or more databases, and one or interfaces for communicating data with other network devices. During operation each of network nodes responds to a request for a transmission path between a talker node 120 and one or more listener nodes 140a-140c. Talker node 120 and listener nodes 140a-140c may include substantially similar components as those described herein with respect to nodes 130.

Network nodes 130 may embody any processor-based routing and switch computing system suitable for flexibly reserving cycle-slots in ports of network nodes based on a binary schedule scheme. As illustrated in FIG. 3, network nodes 130 may include one or more hardware and/or software components configured to execute software programs, such as software for allocating slots within data transmission cycles associated with network node ports according to a binary scheduling scheme.

According to one embodiment, network nodes 130 may include one or more hardware components such as, for example, a central processing unit (CPU) or microprocessor 131, a random access memory (RAM) module 132, a read-only memory (ROM) module 133, a memory or data storage module 134, a database 135, one or more input/output (I/O) devices 136, and an interface 137. Alternatively and/or additionally, network nodes 130 may include one or more software media components such as, for example, a computer-readable medium including computer-executable instructions for performing methods consistent with certain disclosed embodiments. It is contemplated that one or more of the hardware components listed above may be implemented using software. For example, storage 134 may include a software partition associated with one or more other hardware components of network nodes 130. Network nodes 130 may include additional, fewer, and/or different components than those listed above. It is understood that the components listed above are exemplary only and not intended to be limiting.

CPU 131 may include one or more processors, each configured to execute instructions and process data to perform one or more functions associated with network nodes 130. As illustrated in FIG. 3, CPU 131 may be communicatively coupled to RAM 132, ROM 133, storage 134, database 135, I/O devices 136, and interface 137. CPU 131 may be configured to execute sequences of computer program instructions to perform various processes, which will be described in detail below. The computer program instructions may be loaded into RAM 132 for execution by CPU 131.

RAM 132 and ROM 133 may each include one or more devices for storing information associated with an operation of network nodes 130 and/or CPU 131. For example, ROM 133 may include a memory device configured to access and store information associated with network nodes 130, including information for identifying and registering MAC addresses associated with network nodes 130. RAM 132 may include a memory device for storing data associated with one or more operations of CPU 131. For example, ROM 133 may load instructions into RAM 132 for execution by CPU 131.

Storage 134 may include any type of mass storage device configured to store information that CPU 131 may need to perform processes consistent with the disclosed embodiments. For example, storage 134 may include one or more magnetic and/or optical disk devices, such as hard drives, CD-ROMs, DVD-ROMs, or any other type of mass media device. Alternatively or additionally, storage 134 may include flash memory mass media storage or other semiconductor-based storage medium.

Database 135 may include one or more software and/or hardware components that cooperate to store, organize, sort, filter, and/or arrange data used by network nodes 130 and/or CPU 131. CPU 131 may access the information stored in database 135 to in order to identify the port locations associated with packets addressed to incoming MAC addresses. It is contemplated that database 135 may store additional and/or different information than that listed above.

I/O devices 136 may include one or more components configured to communicate information with a component or user associated with simulation environment 100. For example, I/O devices 136 may include a console with an integrated keyboard and mouse to allow a user to input parameters associated with network nodes 130. According to one embodiment, I/O devices 136 may be configured to receive one or more requests to stream data between a talker node and one or more listener nodes 140a-140c via paths between one or more of intermediate nodes 130a-130g. I/O devices 136 may also include a display including a graphical user interface (GUI) for providing a network management console for network administrators to configure network nodes 130. I/O devices 136 may also include peripheral devices such as, for example, a printer for printing information associated with network nodes 130, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices may be configured to output network analysis results and traffic characteristics.

Interface 137 may include one or more components configured to transmit and receive data via a communication network, such as the Internet, a local area network, a workstation peer-to-peer network, a direct link network, a wireless network, or any other suitable communication platform. For example, interface 137 may include one or more modulators, demodulators, multiplexers, demultiplexers, network communication devices, wireless devices, antennas, modems, and any other type of device configured to enable data communication via a communication network. According to one embodiment, interface 137 may be coupled to or include wireless communication devices, such as a module or modules configured to transmit information wirelessly using Wi-Fi or Bluetooth wireless protocols.

Processes and methods consistent with the disclosed embodiments provide a solution for flexibly dedicating bandwidth in each cycle of the node's transmission sequence to ensure that certain reserved transmission tasks can be performed. In particular, the presently disclosed systems and methods enable a network node to subdivide each cycle of bandwidth into a plurality of slots or various sizes and allocate individual slots (for each cycle) to be dedicated to the transmission of data from a queue associated with the reserved stream. Because the slots are assigned and allocated based on the specific requirements contained in the request for the reserved stream, and because each of the nodes is synchronized, the system can be customized to meet most any specific data performance demand (assuming that the required number of slots have not previously been dedicated to other reserved streams).

Figure 4:
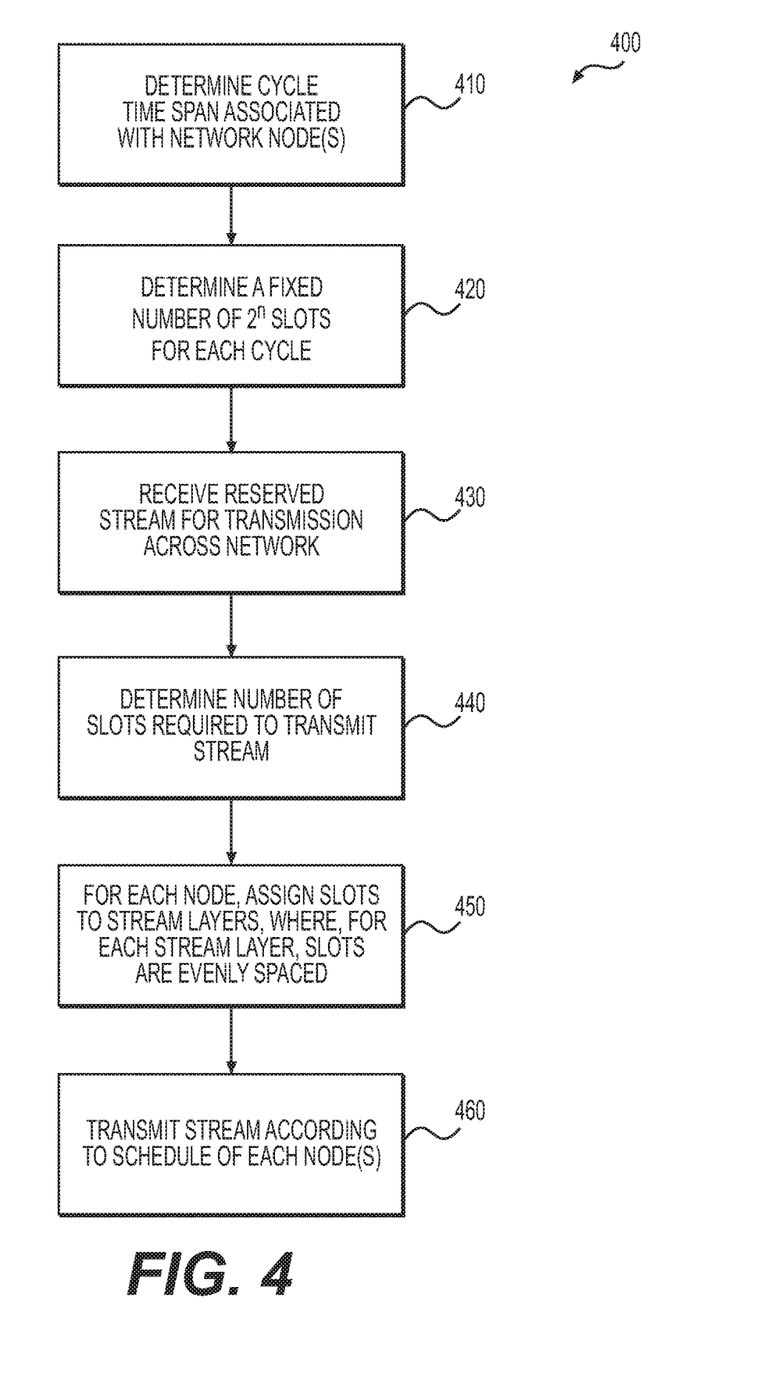
FIG. 4 provides a flowchart depicting an exemplary method for scheduling slot assignments for reserved streams that are to be transmitted through a port on a network node, consistent with certain disclosed embodiments.

FIG. 4 illustrates a flowchart 400 depicting an exemplary method for scheduling slot assignments for reserved streams that are to be transmitted through a port on a network node. The process commences by determining a cycle time span associated with the network node (Block 410). Specifically, before slot assignments can be made, the slots schedule must first be developed. In order to determine the number of slots in the schedule, the cycle time for the node must first be determined.

Once the cycle time has been determined, the cycle may be subdivided into a plurality of fixed slots (Block 420). For example, as illustrated in FIG. 2, the cycle can be subdivided into 16-slots. Using $2^n$ evenly spaced slots, this 16-slot assignment can be allocated 5 different ways, as denoted by the five different layers. According to one embodiment, the slot may be divided so that it is dedicated to one, very large stream, taking up $2^4$ (or 16) slots.

Once the slots are allocated, the system may receive the reserved stream for transmission across the network (Block 430), and determine the number of slots required to transmit the stream (Block 440). Specifically, the number of slots requested may be determined by the talker node 120 and transmitted to each of the other nodes. For each node that is in the anticipated path, the slots required to accommodate the request may be assigned individually by each node, based on the other network traffic on the port(s) (Block 450). Thus, each port is free to ensure that the sufficient slots are allocated/scheduled in any layer (or combination thereof), so long as the all of the slots are scheduled for each cycle. Once the slots have been assigned, the stream may be transmitted according to the slot assignment scheme developed by each node (Block 460).

Figure 5:
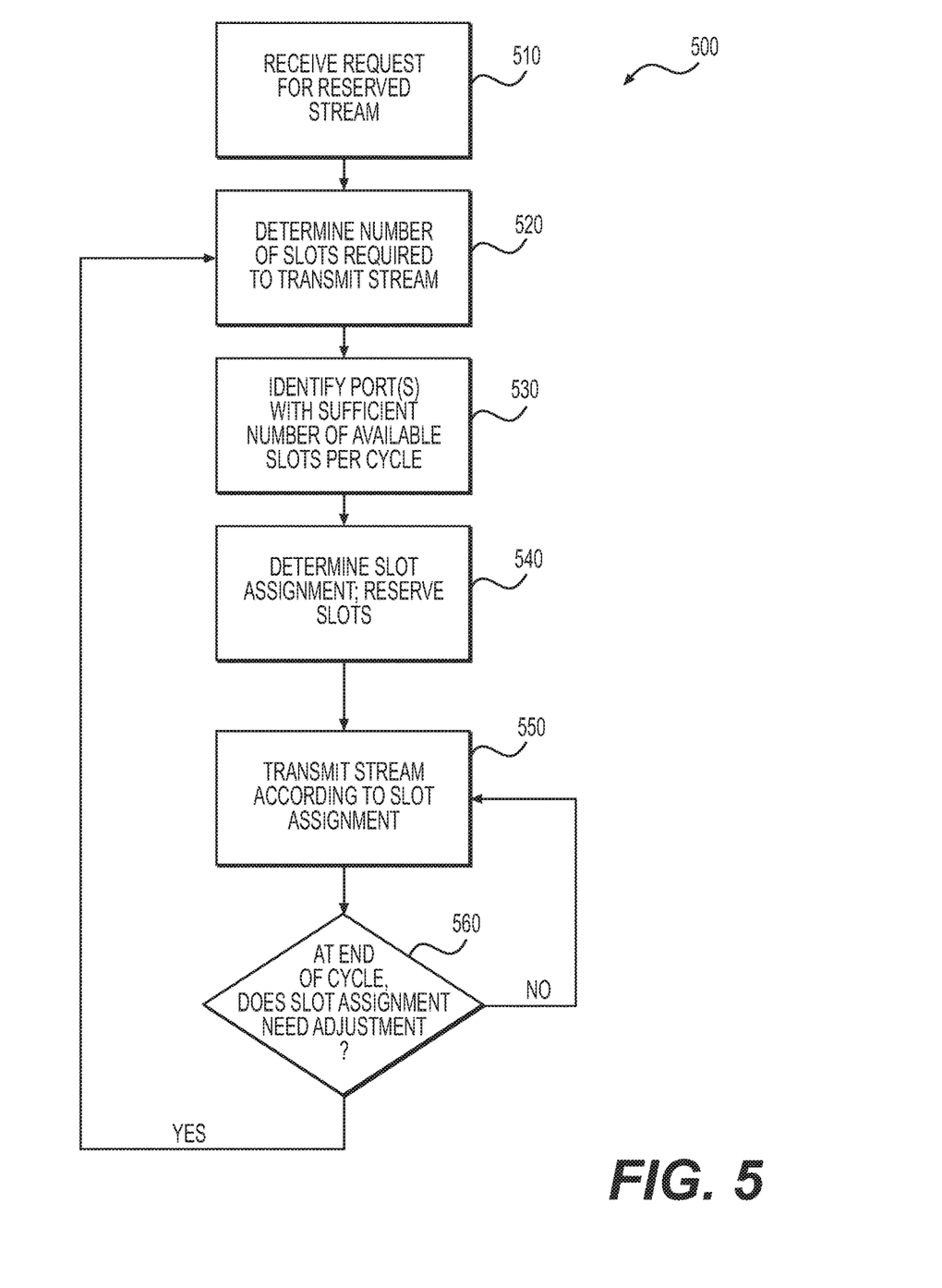
FIG. 5 illustrates a flowchart depicting another exemplary method for scheduling slot assignments for reserved streams that are to be transmitted through a port on a network node, in accordance with certain disclosed embodiments.

FIG. 5 illustrates a flowchart 500 of an exemplary process for transmitting reserved streams across the network. The process commences when a request for a reserved stream is received at a talker node 120 (Block 510). Once received, each of the network nodes may determine, based on the cycle times and link speeds associated with the respective node, the number of slots required to transmit the stream (Block 520). As outlined above, because each node may operate a different link speed (with a different cycle time), each node must determine the number of slots required (at the respective cycle time) to transmit the stream.

Once the number of slots have been determined, each node may be configured to identify port(s) (if any) with sufficient number of slots available (per cycle) to meet the request at the desired level of performance (Block 530). If the node determines that there are insufficient slots available at any of the ports of the node, the node should notify the talker node so that an additional network path may be identified. If the node has sufficient slot availability on at least one port, the node may determined the slot assignment, according to the technique described above, and reserve the desired number of slots per cycle (Block 540).

Once the slot assignments have been made at each node, the system may begin transmitting the stream, according to the slot assignments at each node on the path (Block 550). It is important to note, however, that slot and/or port assignments may be adjusted autonomously by each node, but only at the end of cycle (at the cycle boundary). To do so, each node individually determines whether the slot assignment needs to be adjusted to, for example, to rearrange slots to remove old streams or increase scheduling efficiency (Block 560). If the node determines that no slot adjustments are required (Block 560: No), the node may return to Block 550 and prepare to continue to transmit the stream at the start of the next cycle. If, on the other hand, a node determines that the slot assignment for that node needs to be adjusted (Block 560: Yes), the node may proceed back to Block 520 and repeat the process of slot/port assignment.

It will be apparent to those skilled in the art that various modifications and variations can be made to the disclosed systems and associated methods for flexibly reserving cycle-slots in ports of network nodes based on a binary schedule scheme. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for allocating port assignments for transmitting a reserved stream across a plurality of network nodes in a guaranteed manner, the method comprising:

upon receipt, at a first network node, of a request for transmission of a reserved stream, determining, at the first network node, a number of slots required to transmit the reserved stream, wherein the determination is based on a cycle time corresponding to a link speed associated with the first network node;

identifying, at the first network node, one or more ports of the first network node having a sufficient number of slots available on a per-cycle basis to meet the reserved request at a specified level of performance provided in the reserved request, wherein the first network node is configured to establish, for the one or more ports, a binary scheduling scheme for transmission of packets through the first network node, the scheduling scheme comprising a plurality of scheduling groups, wherein each group of the plurality of scheduling groups is allocated a varying number of equally-spaced slots for the cycle time associated with the first network node, wherein the number of allocated slots of a given scheduling group of the plurality of scheduling groups varies according to a binary relationship to other scheduling groups of the plurality of scheduling groups, and wherein each slot allows for transmission of a predefined number of bits; and assigning, at the first network node, one or more slots associated with a port of the one or more ports to transmit packets associated with the reserved stream, wherein slot assignment includes slots from two or more groups of the plurality of scheduling groups, wherein the reserved stream is transmitted according to the slot assignment.

2. The method of claim 1, comprising:

identifying, at a second network node, one or more ports of the second network node having a sufficient number of slots available on a per-cycle basis, wherein the second network node is configured to establish for the one or more ports of the second network node a binary scheduling scheme of the second network node for transmission of packets through the second network node, the scheduling scheme comprising a plurality of scheduling groups, wherein each group of the plurality of scheduling groups is allocated a varying number of equally-spaced slots for a cycle time corresponding to a link speed associated with the second network node, wherein the number of allocated slots, of the second network node, of a given scheduling group of the plurality of scheduling groups varies according to a binary relationship to other scheduling groups of the plurality of scheduling groups; and assigning, at the second network node, one or more slots associated with a port of the one or more ports of the second network node to transmit packets associated with the reserved stream, wherein the slot assignment of the second network node includes slots from two or more groups of the plurality of scheduling groups of the second network node, wherein the reserved stream is transmitted, at the second network node, according to the slot assignment of the second network node.

3. The method of claim 2, wherein the first network node and the second network node each operates at a different link speed.

4. The method of claim 2, wherein the first network node is a talker node, and wherein the first network node is configured to identify additional network path for the reserved stream upon receiving, from the second network node, notification of an insufficient slots available at the second network node to transmit the reserved stream.

5. The method of claim 2, wherein the first network node is configured to reserve the one or more slots associated with the port of the one or more ports of the second network node.

6. The method of claim 2, wherein the first network node and the second network node each transmits the received reserved stream once the slot assignments have been made at each respective node.

7. The method of claim 2, comprising:

adjusting, at the first network node, slot and/or port assignments of the first network node at a cycle boundary of the first network node.

8. The method of claim 7, wherein the adjustment of the slot and/or port assignments of the first network node comprises rearranging slots to remove old streams.

9. The method of claim 2, comprising:

adjusting, at the second network node, slot and/or port assignments of the second network node at a cycle boundary of the second network node.

10. The method of claim 2, comprising:

adjusting, at the second network node, slot and/or port assignments of the first network node at a cycle boundary of the second network node.

11. The method of claim 1, comprising:

determining, by the first network node, at a cycle boundary of the first network node, that the assigned one or more slots associated with the port of the first network node are candidates for reassignment;

identifying, by the first network node, for each slot that is a candidate for reassignment, a respective alternate slot; and modifying, by the first network node, prior to a start of a new cycle, a slot assignment for the first network node, based on the identification.

12. The method of claim 11, comprising:

transmitting, by the first network node, the modified slot assignment for the first network node to one or more other network nodes associated with transmission of the reserved stream.

13. The method of claim 1, comprising synchronizing the cycle time associated with the first network node with one or more other network nodes associated with transmission of the reserved stream.

14. A network node comprising:

a plurality of ports;

a processor; and a memory having instructions stored thereon, wherein execution of the instructions causes the processor to:

upon receipt of a request for transmission of a reserved stream, determine a number of slots required to transmit the reserved stream, wherein the determination is based on a cycle time corresponding to a link speed associated with the network node;

identify one or more ports, of the plurality of ports, having a sufficient number of slots available on a per-cycle basis to meet the reserved request at a specified level of performance provided in the reserved request, wherein a binary scheduling scheme is established for transmission of packets of the reserved stream, the scheduling scheme comprising a plurality of scheduling groups, wherein each group of the plurality of scheduling groups is allocated a varying number of equally-spaced slots for the cycle time associated with the network node, wherein the number of allocated slots of a given scheduling group of the plurality of scheduling groups varies according to a binary relationship to other scheduling groups of the plurality of scheduling groups, and wherein each slot allows for transmission of a predefined number of bits; and assign one or more slots associated with a port of the one or more ports to transmit packets associated with the reserved stream, wherein slot assignment includes slots from two or more groups of the plurality of scheduling groups, wherein the reserved stream is transmitted according to the slot assignment.

15. The network node of claim 14, wherein execution of the instructions causes the processor to identify additional network path for the reserved stream upon receiving, from another network node, notification of an insufficient slots available at the another network node.

16. The network node of claim 14, wherein execution of the instructions causes the processor to:

reserve slots at other network nodes.

17. The network node of claim 14, wherein execution of the instructions causes the processor to:

adjust slot and/or port assignments at a cycle boundary of the network node.

18. The network node of claim 17, wherein the adjustment of the slot and/or port assignments comprises rearranging slots to remove old streams.

19. The network node of claim 14, wherein execution of the instructions causes the processor to:
determine at a cycle boundary of the network node that the assigned one or more slots associated with the port of the network node are candidates for reassignment;
identify for each slot that is a candidate for reassignment, a respective alternate slot; and
modify prior to a start of a new cycle, a slot assignment for the network node, based on the identification.

20. The network node of claim 19, wherein execution of the instructions causes the processor to:
transmit the modified slot assignment for the network node to one or more other network nodes associated with transmission of the reserved stream.

21. The network node of claim 19, wherein execution of the instructions causes the processor to:
synchronize the cycle time associated with the network node with one or more other network nodes associated with transmission of the reserved stream.

22. A non-transitory computer readable medium having instructions stored thereon, wherein execution of the instructions cause a processor of a network device to:
upon receipt of a request for transmission of a reserved stream, determine a number of slots required to transmit the reserved stream, wherein the determination is based on a cycle time corresponding to a link speed associated with the network device;
identify one or more ports, of a plurality of ports of the network device, having a sufficient number of slots available on a per-cycle basis to meet the reserved request at a specified level of performance provided in the reserved request, wherein a binary scheduling scheme is established for transmission of packets of the reserved stream, the scheduling scheme comprising a plurality of scheduling groups, wherein each group of the plurality of scheduling groups is allocated a varying number of equally-spaced slots for the cycle time associated with the network device, wherein the number of allocated slots of a given scheduling group of the plurality of scheduling groups varies according to a binary relationship to other scheduling groups of the plurality of scheduling groups, and wherein each slot allows for transmission of a pre-defined number of bits; and
assign one or more slots associated with a port of the one or more ports to transmit packets associated with the reserved stream, wherein slot assignment includes slots from two or more groups of the plurality of scheduling groups, wherein the reserved stream is transmitted according to the slot assignment.

* * * * *